United States Patent
Lin et al.

(10) Patent No.: US 9,664,900 B2
(45) Date of Patent: May 30, 2017

(54) PROJECTION APPARATUS AND PROJECTION METHOD

(71) Applicants: LITE-ON ELECTRONICS (GUANGZHOU) LIMITED, Guangzhou OT (CN); Lite-On Technology Corporation, Taipei OT (TW)

(72) Inventors: Wen-Lung Lin, Taipei (TW); Chia-Hao Hsu, Taipei (TW); De-Jian Ou, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 85 days.

(21) Appl. No.: 14/594,174

(22) Filed: Jan. 12, 2015

(65) Prior Publication Data
US 2015/0249809 A1    Sep. 3, 2015

(30) Foreign Application Priority Data
Feb. 28, 2014 (CN) .......................... 2014 1 0071590

(51) Int. Cl.
*H04N 9/31* (2006.01)
*G03B 21/14* (2006.01)
*G02B 26/10* (2006.01)
*H04N 1/113* (2006.01)
*G02B 26/08* (2006.01)

(52) U.S. Cl.
CPC ....... *G02B 26/105* (2013.01); *G02B 26/0833* (2013.01); *H04N 1/113* (2013.01); *H04N 9/3135* (2013.01); *H04N 9/3173* (2013.01); *H04N 9/3185* (2013.01); *G03B 21/147* (2013.01)

(58) Field of Classification Search
CPC .. H04N 9/3129; H04N 9/3161; H04N 9/3164; H04N 9/3135; H04N 9/3132; H04N 9/3185; G03B 21/2066; G03B 21/2013; G03B 21/2033; G03B 21/28; G03B 21/14; G03B 21/147
See application file for complete search history.

(56) References Cited

U.S. PATENT DOCUMENTS

| | | | |
|---|---|---|---|
| 8,717,655 B2* | 5/2014 | Ishida | G02B 26/085 353/30 |
| 2014/0078121 A1* | 3/2014 | Chikaoka | H04N 9/3129 345/204 |

* cited by examiner

*Primary Examiner* — Toan Ton
*Assistant Examiner* — Ryan Howard
(74) *Attorney, Agent, or Firm* — Jianq Chyun IP Office

(57) ABSTRACT

A projection apparatus including a micro-electro-mechanical system (MEMS) mirror module and a control unit is provided. The MEMS mirror module drives an image beam to scan along a first direction and a second direction on an imaging region. The control unit is electrically connected to the MEMS mirror module and outputs a driving signal with a corresponding pulse width according to a projection position of the image beam in the second direction of the imaging region. A projection method is also provided.

8 Claims, 5 Drawing Sheets

PROJECTION APPARATUS AND PROJECTION METHOD

CROSS-REFERENCE TO RELATED APPLICATION

This application claims the priority benefit of China application serial no. 201410071590.7, filed on Feb. 28, 2014. The entirety of the above-mentioned patent application is hereby incorporated by reference herein and made a part of this specification.

BACKGROUND OF THE INVENTION

Field of the Invention

The invention relates to a projection apparatus and a projection method, and particularly relates to a projection apparatus having a micro-electro-mechanical system (MEMS) mirror and a projection method.

Description of Related Art

In recent years, the miniature projection apparatus has been developed to meet the needs for mobile projection. Since the miniature projection apparatus is widely applicable for various purposes such as family, business, travel, game, mobility, etc., it has become a focus of the technological development in the field of miniature projection apparatuses. On the other hand, a two-dimensional mirror element system, which is manufactured utilizing the micro-electro-mechanical system (MEMS) technology, has advantages such as small size, light weight, low power consumption, and, stable performance, etc., and therefore is also applied in the miniature projection apparatus as a driving element for image scanning and projection.

However, the two-dimensional mirror element system manufactured utilizing the MEMS technology has a very sophisticated structure. As a result, motions of the two-dimensional mirror element system in the horizontal direction and the vertical direction may affect each other. Thus, when an image beam is projected to an imaging region through a MEMS mirror, the image that is projected through scanning may be deformed.

SUMMARY OF THE INVENTION

The invention provides a projection apparatus and a projection method for eliminating deformation of an image.

The projection apparatus of the invention includes a micro-electro-mechanical system (MEMS) mirror module and a control unit. The MEMS mirror module is configured to drive an image beam to scan along a first direction and a second direction on an imaging region. The control unit is electrically connected to the MEMS mirror module and outputs a driving signal with a corresponding pulse width according to a projection position of the image beam in the second direction of the imaging region. The driving signal is used to control the MEMS mirror module to drive a scan opening angle of the image beam along the first direction of the imaging region.

The projection method of the invention includes the following steps. A MEMS mirror module is driven to drive an image beam to scan along a first direction and a second direction on an imaging region. A driving signal with a corresponding pulse width is outputted according to a projection position of the image beam in the second direction of the imaging region. The driving signal is used to control the MEMS mirror module to drive a scan opening angle of the image beam along the first direction of the imaging region.

In an embodiment of the invention, the pulse width of the driving signal shows a periodical variation in accordance with a change of the projection position of the image beam in the imaging region in the second direction.

In an embodiment of the invention, when the projection position of the image beam in the second direction moves from an edge position in the second direction of the imaging region to a center position in the second direction of the imaging region, the pulse width of the driving signal decreases.

In an embodiment of the invention, when the image beam is projected to an edge position in the second direction, the driving signal has a first pulse width; and when the image beam is projected to a center position in the second direction, the driving signal has a second pulse width, wherein the first pulse width is greater than the second pulse width.

Based on the above, the projection apparatus and the projection method of the embodiments of the invention utilize the driving signal with different pulse widths to control the swing amplitude of the mirror, so as to control the scan opening angle of the image beam when the image beam is projected to different positions of the imaging region, thereby eliminating deformation of the image.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
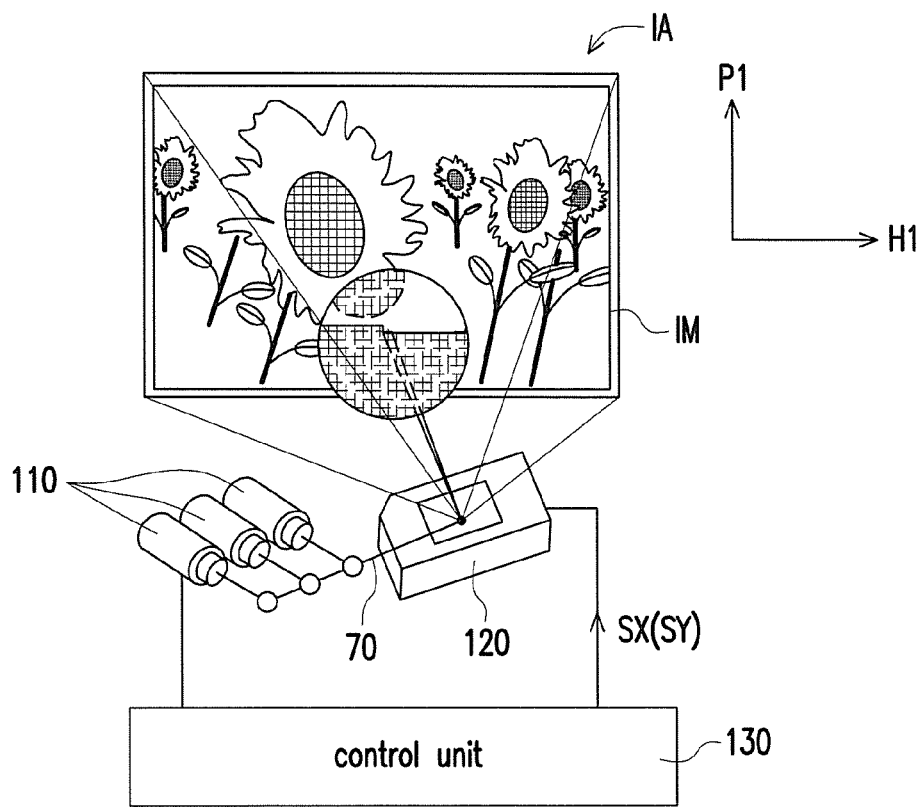
FIG. 1 is a schematic diagram illustrating a configuration of a projection apparatus according to an embodiment of the invention.
Figure 2:
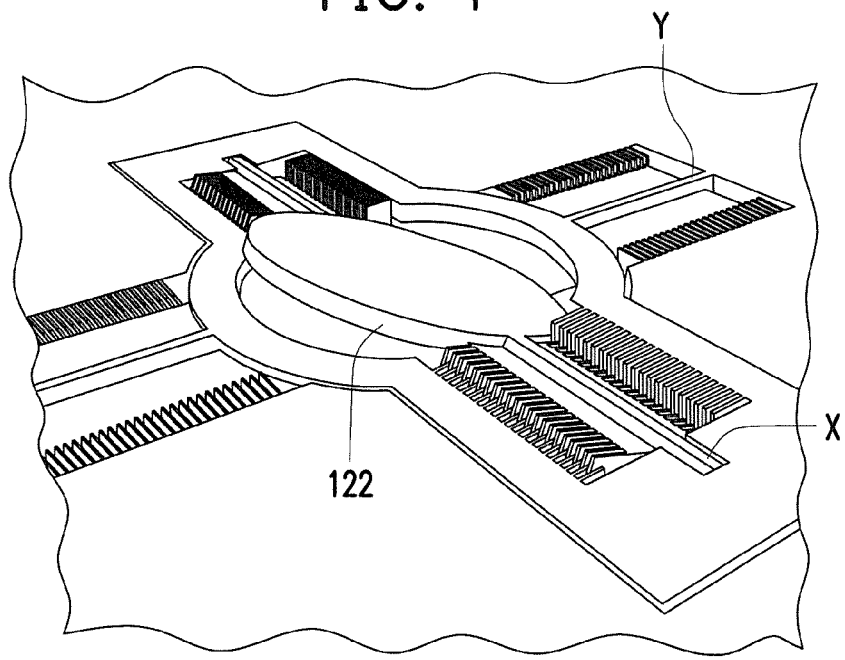
FIG. 2 is a schematic diagram of a MEMS mirror module of FIG. 1.

FIG. 1 is a schematic diagram illustrating a configuration of a projection apparatus according to an embodiment of the invention. FIG. 2 is a schematic diagram of a micro-electromechanical system (MEMS) mirror module of FIG. 1. With reference to FIG. 1 and FIG. 2, the projection apparatus of this embodiment includes a light source module 110, a MEMS mirror module 120, and a control unit 130. The MEMS mirror module 120 includes a mirror 122, wherein the mirror 122 is capable of performing two-dimensional swing. The control unit 130 is electrically connected to the light source module 110 and the MEMS mirror module 120, and outputs a driving signal SX (or a driving signal SY) to the MEMS mirror module 120, so as to drive the mirror 122 in the MEMS mirror module 120 to swing with respect to an X axis (or a Y axis), such that an image beam 70 provided by the light source module 110 is projected to different positions in an imaging region IA through the MEMS mirror module 120.

More specifically, in this embodiment, the swing of the mirror 122 with respect to the X axis for example causes a projection point of the image beam 70 in the imaging region IA to scan along a horizontal direction H1 of the imaging region IA, and the swing of the mirror 122 with respect to the Y axis for example causes the projection point of the image beam 70 in the imaging region IA to scan along a vertical direction P1 of the imaging region IA, so as to project an image IM in the imaging region IA. However, the invention is not limited thereto. Because the MEMS mirror module 120 manufactured using the MEMS technology has a very sophisticated structure, the swings of the mirror 122 with respect to the X axis and the Y axis may affect each other easily. Therefore, when the image beam 70 is projected to the imaging region IA through the MEMS mirror module 120, the image IM obtained through the scanning and projection may be deformed. Details are described below with reference to FIG. 3A to FIG. 3C.

Figure 3A:
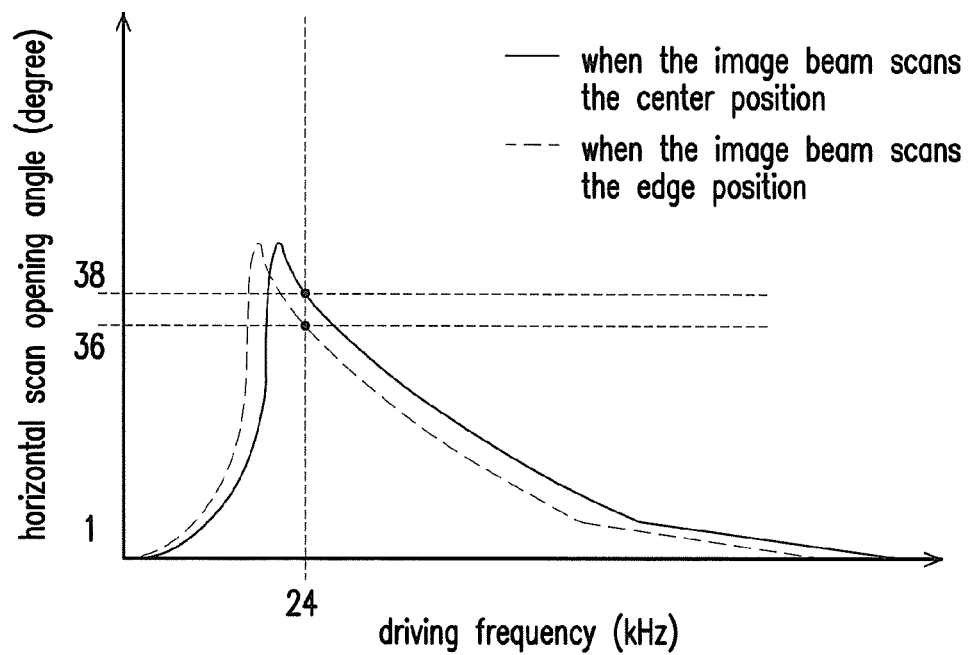
FIG. 3A is a graph illustrating a relationship between a horizontal scan opening angle and a driving frequency when an image beam is projected to an imaging region.
Figure 3B:
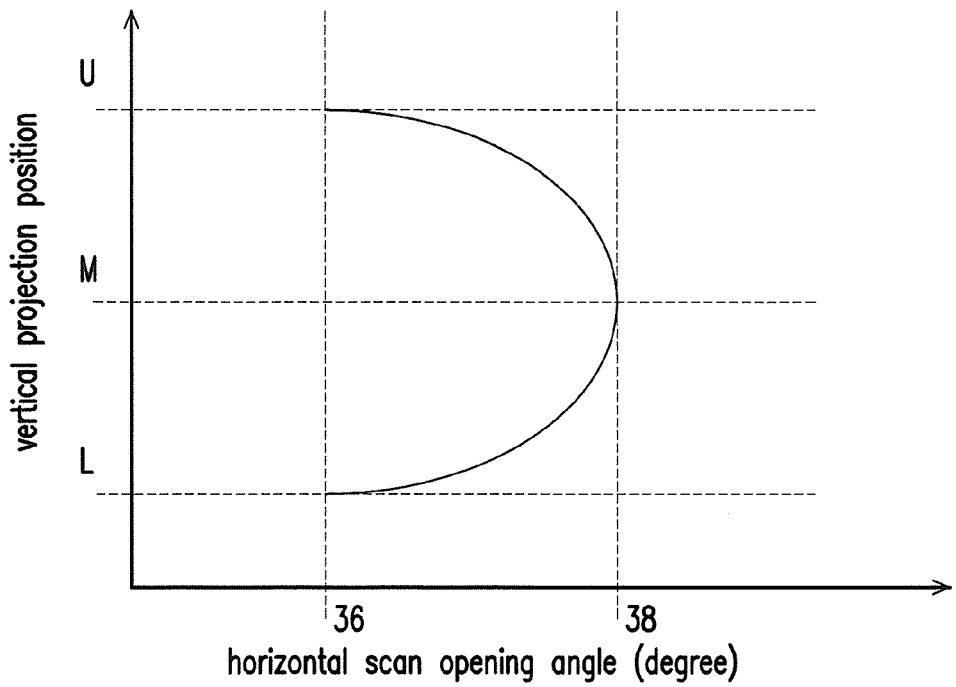
FIG. 3B is a graph illustrating a relationship between a vertical projection position and the horizontal scan opening angle when the image beam is projected to the imaging region.
Figure 3C:
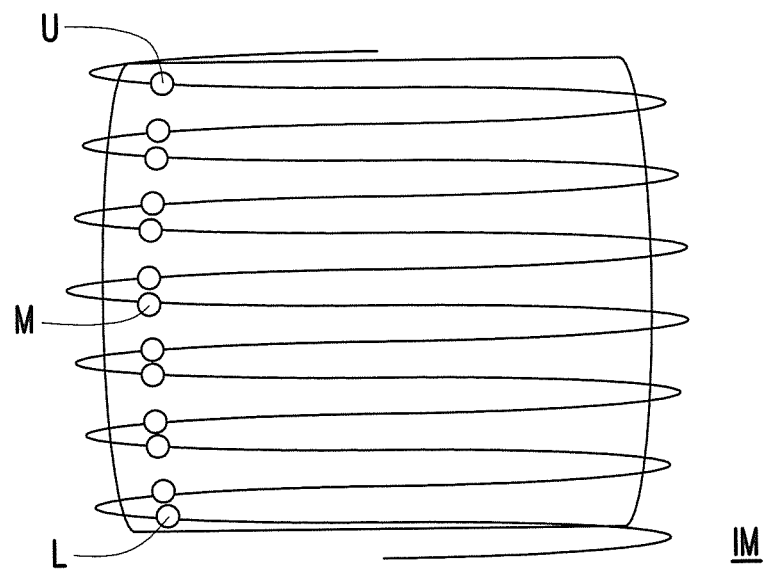
FIG. 3C is a schematic diagram of an image projected according to driving signals having the same pulse width.

FIG. 3A is a graph illustrating a relationship between a horizontal scan opening angle and a driving frequency when the image beam is projected to the imaging region. FIG. 3B is a graph illustrating a relationship between a vertical projection position and the horizontal scan opening angle when the image beam is projected to the imaging region. FIG. 3C is a schematic diagram of an image projected according to driving signals having the same pulse width. With reference to FIG. 3A and FIG. 3B, in FIG. 3A, the control unit 130 drives the MEMS mirror module 120 with the driving signal SX having the same pulse width, such that the mirror 122 swings with respect to the X axis. More specifically, because the swings of the mirror 122 with respect to the X axis and the Y axis affect each other, when the image beam 70 is projected to different positions in the imaging region IA along the vertical direction P1 through the MEMS mirror module 120, the image beam 70 has inconsistent scan opening angles in the horizontal direction H1 of the imaging region IA. For example, as shown in FIG. 3A and FIG. 3B, in a situation that a driving frequency of the driving signal SX is 24 kHz, when the image beam 70 is projected to edge positions L and U in the vertical direction P1, the scan opening angle in the horizontal direction H1 of the imaging region IA is 36 degrees, and when the image beam 70 is projected to a center position M in the vertical direction P1, the scan opening angle in the horizontal direction H1 of the imaging region IA is 38 degrees. As a result, as shown in FIG. 3C, the image IM obtained through scanning and projection of the image beam 70 has curved deformation at the sides. It should be noted that the aforementioned value ranges of the angles are given as examples and should not be construed to limit the invention.

It is known from the above that, in the case where the control unit 130 drives the MEMS mirror module 120 with the driving signal SX having the same pulse width, when the image beam 70 is projected to different positions in the vertical direction P1 of the imaging region IA, the image beam 70 has inconsistent scan opening angles in the horizontal direction H1 of the imaging region IA. Thus, the image IM generated through projection of the image beam 70 has curved deformation at the sides (as illustrated in FIG. 3C). Hence, in this embodiment of the invention, a pulse width modulation (PWM) is performed on the driving signal SX through the control unit 130, so as to control a swing amplitude of the mirror 122 of the MEMS mirror module 120 with respect to the X axis, thereby achieving the effect of controlling the scan opening angle of the image beam 70 in the horizontal direction H1 of the imaging region IA and avoiding curved deformation at the sides of the image IM projected by the image beam 70. Details are further described below with reference to FIG. 3D.

Figure 3D:
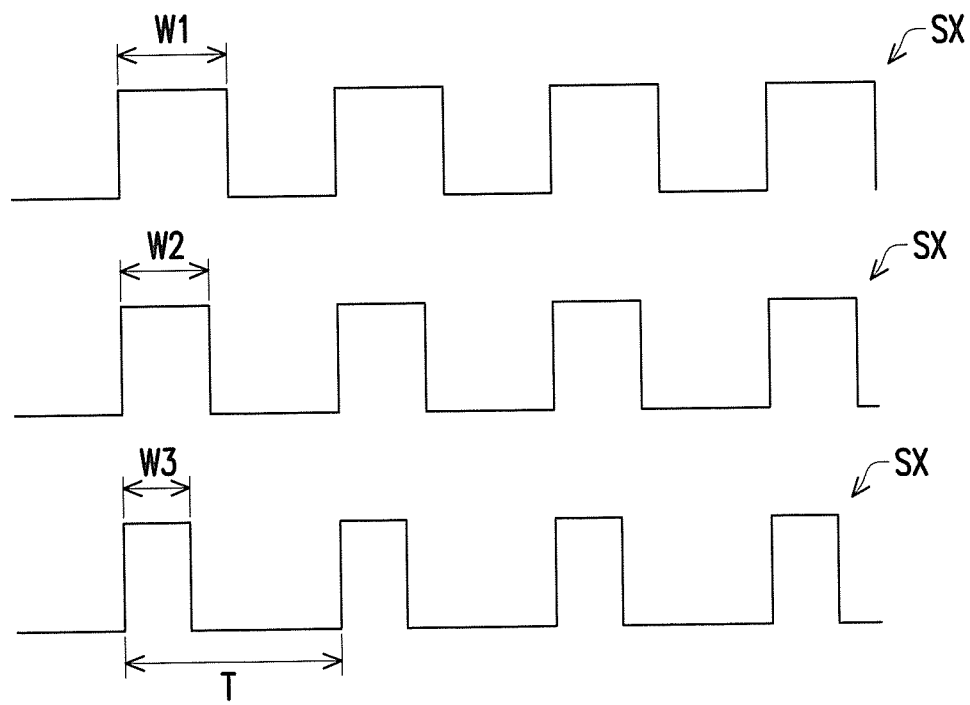
FIG. 3D is a schematic diagram of driving signals with different pulse widths according to an embodiment of the invention.

FIG. 3D is a schematic diagram of driving signals with different pulse widths according to an embodiment of the invention. For example, with reference to FIG. 3D, a pulse width W1 is 50% of a period T of the driving signal SX, a pulse width W2 is 40% of the period T of the driving signal SX, and a pulse width W3 is 30% of the period T of the driving signal SX. More specifically, if using the driving signal SX with pulse width W1 to drive the MEMS mirror module 120, the scan opening angle of the image beam 70 in the horizontal direction H1 of the imaging region IA is 100%, then the scan opening angle of the image beam 70 in the horizontal direction H1 of the imaging region IA is 80% when using the driving signal SX with pulse width W2 to drive the MEMS mirror module 120, and the scan opening angle of the image beam 70 in the horizontal direction H1 of the imaging region IA is 60% when using the driving signal SX with pulse width W3 to drive the MEMS mirror module 120. In other words, by using the control unit 130 to perform the pulse width modulation on the driving signal SX to adjust the scan opening angle of the image beam 70 in the horizontal direction H1 of the imaging region IA, deformation of the image IM is eliminated. Steps of the projection method of this embodiment are explained in further details hereinafter with reference to FIG. 4A to FIG. 4C. It should be noted that the aforementioned value ranges of the angles are given as examples and should not be construed to limit the invention.

Figure 4A:
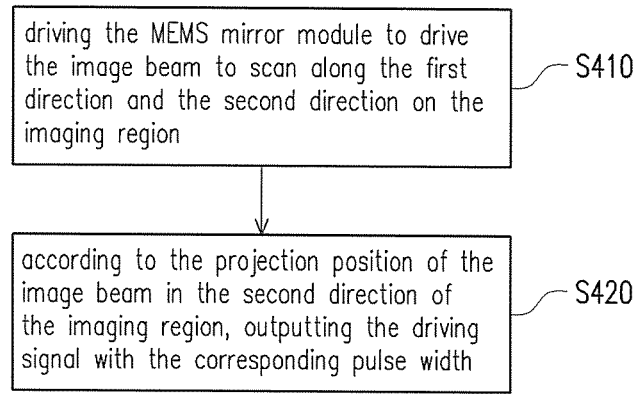
FIG. 4A is a flowchart illustrating a projection method according to an embodiment of the invention.

FIG. 4A is a flowchart illustrating the projection method according to an embodiment of the invention. With reference to FIG. 1, FIG. 2, and FIG. 4A, in this embodiment, the projection method is executed using the projection apparatus of FIG. 1, for example. Hereinafter, each component and module in the projection apparatus is referred to further describe the steps of the projection method of this embodiment. First, Step S410 is performed to drive the MEMS mirror module 120 to drive the image beam 70 to scan along a first direction D1 and a second direction D2 on the imaging region IA. In this embodiment, the first direction D1 is parallel to the horizontal direction H1 and the second direction D2 is parallel to the vertical direction P1, for example (the relationship between the directions of this embodiment is illustrated in FIG. 4C). Next, Step S420 is performed, wherein according to the projection position of the image beam 70 in the second direction D2 of the imaging region IA, the control unit 130 outputs the driving signal SX with the corresponding pulse width, so as to control the MEMS mirror module 120 to drive the scan opening angle of the image beam 70 along the first direction D1 of the imaging region IA. More specifically, in Step S420, when the image beam 70 is projected to a first position in the second direction D2 of the imaging region IA, the control unit 130 outputs the driving signal SX with a corresponding first pulse width to control the MEMS mirror module 120 to drive the image beam 70 such that the image beam 70 has a first scan opening angle along the first direction D1 of the imaging region IA; and when the image beam 70 is projected to a second position in the second direction D2 of the imaging region IA, the control unit 130 outputs the driving signal SX with a corresponding second pulse width to control the MEMS mirror module 120 to drive the image beam 70 such that the image beam 70 has a second scan opening angle along the first direction D1 of the imaging region IA. Here, the first pulse width is different from the second pulse width, and the first scan opening angle is different from the second scan opening angle. Steps of the projection method of this embodiment are explained in further details hereinafter with reference to FIG. 4B to FIG. 4C.

Figure 4B:
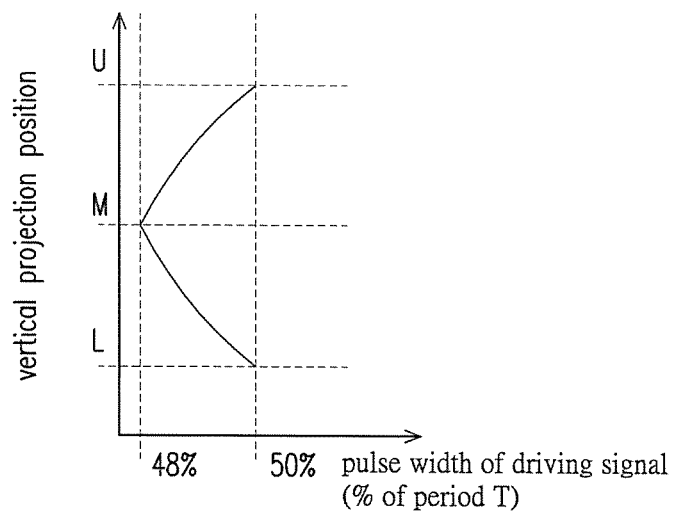
FIG. 4B is a graph illustrating a relationship between the vertical projection position and the pulse width of the driving signal when the image beam is projected to the imaging region according to an embodiment of the invention.
Figure 4C:
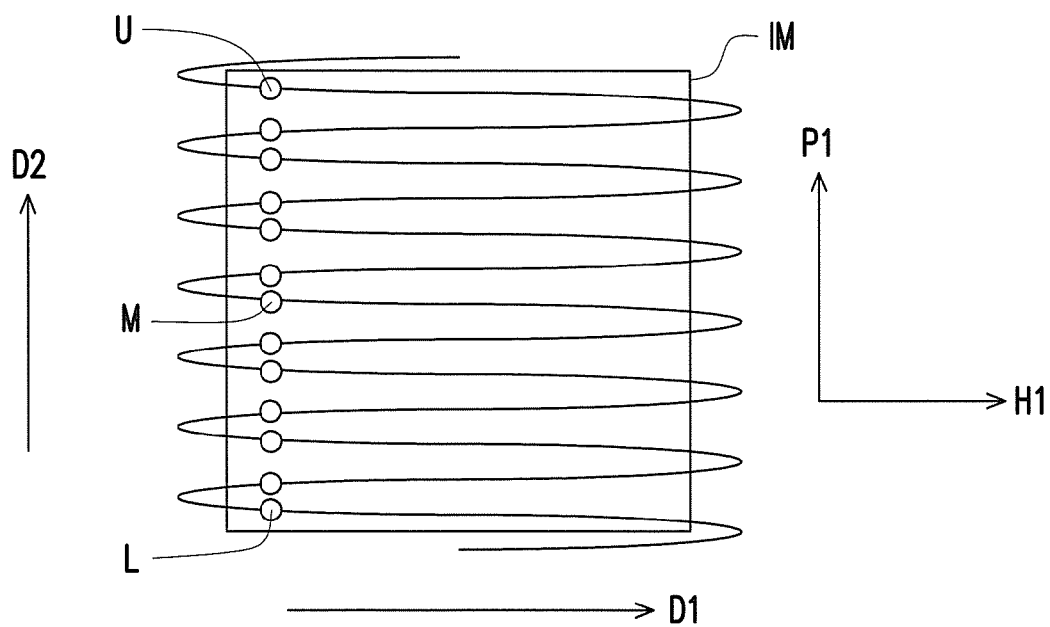
FIG. 4C is a schematic diagram of an image that is generated when the image beam is projected to the imaging region according to an embodiment of the invention.

FIG. 4B is a graph illustrating a relationship between the vertical projection position and the pulse width of the driving signal when the image beam is projected to the imaging region according to an embodiment of the invention. FIG. 4C is a schematic diagram of an image that is generated when the image beam is projected to the imaging region according to an embodiment of the invention. Further, as shown in FIG. 4B and FIG. 4C, the pulse width of the driving signal SX shows a periodical variation in accordance with the change of the projection position of the image beam 70 in the imaging region IA in the second direction D2. More specifically, the periodical variation is defined as follows: when the projection position (e.g., vertical projection position) of the image beam 70 in the second direction D2 moves from the edge position U in the second direction D2 of the imaging region IA to the center position M in the second direction D2 of the imaging region IA, the pulse width of the driving signal SX decreases; and when the projection position of the image beam 70 in the second direction D2 moves from the center position M in the second direction D2 of the imaging region IA to the edge position L in the second direction D2 of the imaging region IA, the pulse width of the driving signal SX increases. And, vice versa. In other words, when the projection of the image beam 70 moves between different positions U, M, and L in the second direction D2 of the imaging region IA, the pulse width of the driving signal SX decreases or increases accordingly and presents the periodical variation. More specifically, as shown in FIG. 4B and FIG. 4C, when the image beam 70 is projected to the edge positions L and U in the second direction D2, the driving signal SX has a first pulse width, and the first pulse width is 50% of the period T of the driving signal SX; and when the image beam 70 is projected to the center position M in the second direction D2, the driving signal SX has a second pulse width, and the second pulse width is 48% of the period T of the driving signal SX. That is to say, in this embodiment, the first pulse width is greater than the second pulse width. Accordingly, as shown in FIG. 4C, when the image beam 70 is projected to the center position M in the second direction D2, the scan opening angle of the image beam 70 in the imaging region IA in the horizontal direction H1 is reduced to eliminate the curved deformation that occurs at the sides of the image IM. It should be noted that the aforementioned value ranges of the angles are given as examples and should not be construed to limit the invention.

To conclude the above, the projection apparatus and the projection method of the embodiments of the invention output the driving signal with the corresponding pulse width according to different projection positions of the image beam in the imaging region, so as to control the swing amplitude of the mirror of the MEMS mirror module, such that the image beam has the corresponding scan opening angle when being projected to different positions of the imaging region. Thereby, deformation of the image is eliminated.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A projection apparatus, comprising:
    a micro-electro-mechanical system (MEMS) mirror module configured to drive an image beam to scan along a first direction and a second direction on an imaging region; and
    a control unit electrically connected to the MEMS mirror module and configured to output a driving signal with a corresponding pulse width according to a projection position of the image beam in the second direction of the imaging region,
    wherein the driving signal is configured to control the MEMS mirror module to drive a scan opening angle of the image beam along the first direction of the imaging region,
    wherein when the projection position of the image beam in the second direction moves from a first edge position to a second edge position through a center position in the second direction of the imaging region, the pulse width of the driving signal only decreases from the first edge position to the center position and only increases from the center position to the second edge position.

2. The projection apparatus according to claim 1, wherein:
    when the image beam is projected to a first position in the second direction of the imaging region, the control unit outputs the driving signal with a first pulse width, and the image beam has a first scan opening angle along the first direction of the imaging region; and
    when the image beam is projected to a second position in the second direction of the imaging region, the control unit outputs the driving signal with a second pulse width, and the image beam has a second scan opening angle along the first direction of the imaging region;
    wherein the first pulse width is different from the second pulse width, and the first scan opening angle is different from the second scan opening angle.

3. The projection apparatus according to claim 1, wherein the pulse width of the driving signal shows a periodical variation in accordance with a change of the projection position of the image beam in the imaging region in the second direction.

4. The projection apparatus according to claim 1, wherein when the image beam is projected to an edge position in the second direction, the driving signal has a first pulse width; and when the image beam is projected to a center position in the second direction, the driving signal has a second pulse width, wherein the first pulse width is greater than the second pulse width.

5. A projection method, comprising:

driving a MEMS mirro module to drive an image beam to scan along a first direction and a second direction on an imaging region; and outputting a driving signal with a corresponding pulse width according to a projection position of the image beam in the second direction of the imaging region, wherein the driving signal is configured to control the MEMS mirror module to drive a scan opening angle of the image beam along the first direction of the imaging region, wherein when the projection position of the image beam in the second direction moves from a first edge position to a second edge position through a center position in the second direction of the imaging region, the pulse width of the driving signal only decreases from the first edge position to the center position and only increases from the center position to the second edge position.

6. The projection method according to claim 5, wherein:

when the image beam is projected to a first position in the second direction of the imaging region, the control unit outputs the driving signal with a first pulse width, and the image beam has a first scan opening angle along the first direction of the imaging region; and when the image beam is projected to a second position in the second direction of the imaging region, the control unit outputs the driving signal with a second pulse width, and the image beam has a second scan opening angle along the first direction of the imaging region;

wherein the first pulse width is different from the second pulse width, and the first scan opening angle is different from the second scan opening angle.

7. The projection method according to claim 5, wherein the pulse width of the driving signal shows a periodical variation in accordance with a change of the projection position of the image beam in the imaging region in the second direction.

8. The projection method according to claim 5, wherein when the image beam is projected to an edge position in the second direction, the driving signal has a first pulse width; and when the image beam is projected to a center position in the second direction, the driving signal has a second pulse width, wherein the first pulse width is greater than the second pulse width.

* * * * *